US012640665B2

(12) United States Patent
Kohtamaki et al.

(10) Patent No.: US 12,640,665 B2
(45) Date of Patent: May 26, 2026

(54) POWER INVERTER WITH REDUCED BODY DIODE CONDUCTION

(71) Applicant: Eaton Intelligent Power Limited, Dublin (IE)

(72) Inventors: Tuomo Matias Kohtamaki, Helsinki (FI); Christopher Jedd, Knightdale, NC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 243 days.

(21) Appl. No.: 18/558,671

(22) PCT Filed: May 4, 2022

(86) PCT No.: PCT/EP2022/025203
§ 371 (c)(1),
(2) Date: Nov. 2, 2023

(87) PCT Pub. No.: WO2022/233456
PCT Pub. Date: Nov. 10, 2022

(65) Prior Publication Data
US 2024/0223102 A1 Jul. 4, 2024

(30) Foreign Application Priority Data
May 5, 2021 (GB) ..................................... 2106425

(51) Int. Cl.
*H02M 7/537* (2006.01)
*H02H 9/02* (2006.01)
*H02M 1/32* (2007.01)

(52) U.S. Cl.
CPC .............. *H02M 7/537* (2013.01); *H02H 9/02* (2013.01); *H02M 1/325* (2021.05)

(58) Field of Classification Search
CPC ......... H02H 9/02; H02M 7/537; H02M 1/325
See application file for complete search history.

(56) References Cited

U.S. PATENT DOCUMENTS 5,896,257 A * 4/1999 Takahashi ......... H02M 7/53875
361/93.6
2002/0101751 A1 8/2002 Wade
(Continued)

FOREIGN PATENT DOCUMENTS

CN 111277158 A 6/2020
CN 112600450 A 4/2021
(Continued)

OTHER PUBLICATIONS

Sahu, Pradeep Kumar; Maity, Somnath; Dynamic Performance Enhancement of Voltage Source Inverter by Constant-Frequency Hysteretic Current Controller; IEEE; Proceeding of the 2014 IEEE Students; Technology Symposium; Mar. 2014, pp. 192-198.*
Komurcugil Hasan, "Combined use of double-band hysteresis current and proportional resonant control methods for single-phase UPS inverters", IECON 2014—40th Annual Conference of the IEEE Industrial Electronics Society, IEEE, Oct. 29, 2014 (Oct. 29, 2014), pp. 1305-1311, XP032739576, DOI: 10.1109/IECON.2014. 7048670 [retrieved on Feb. 24, 2015] abstract; figures 3,4.
(Continued)

*Primary Examiner* — Harry R Behm
(74) *Attorney, Agent, or Firm* — LEYDIG, VOIT & MAYER, LTD.

(57) ABSTRACT
A power inverter comprises a first and a second input terminal, a first output terminal, a first MOSFET which couples the first input terminal to an inverter node, a second MOSFET which couples the second input terminal to the inverter node, an inductor that couples the inverter node to the first output terminal, a current sensor configured to provide a sensor signal that is a function of an inductor current, a comparator arrangement configured to compare the sensor signal with a first limit value and a control arrangement configured to switch the first MOSFET from a conducting state to a non-conducting state and the second MOSFET from a non-conducting state to a conducting state in case the sensor signal rises above the first limit value.

13 Claims, 5 Drawing Sheets

(56) References Cited

U.S. PATENT DOCUMENTS

| | | | |
|---|---|---|---|
| 2007/0008748 A1 | 1/2007 | Tang | |
| 2011/0019322 A1 | 1/2011 | Akama | |
| 2014/0003103 A1* | 1/2014 | Aaltio | H02H 3/08 |
| | | | 363/56.03 |
| 2017/0141609 A1* | 5/2017 | King | H02H 9/025 |
| 2019/0115850 A1* | 4/2019 | Fujimoto | H10D 62/393 |

FOREIGN PATENT DOCUMENTS

| | | | |
|---|---|---|---|
| EP | 1788228 A2 | 5/2007 | |
| EP | 3567713 A1 | 11/2019 | |
| JP | H07 67352 A | 3/1995 | |
| JP | 5 835679 B1 | 12/2015 | |
| JP | 2018 129908 A | 8/2018 | |
| JP | 2019058019 A | 4/2019 | |

OTHER PUBLICATIONS

Singh Jitendra Kumar, et al., "An Improved Hysteresis Current Controller for Grid-Connected Inverter System to Address Power Quality Issues at Reduced Switching Frequency", IEEE Transactions on Industryapplications, IEEE Service Center, Piscataway, NJ, US, vol. 57, No. 2, Jan. 18, 2021 (Jan. 18, 2021), pp. 1892-1901, XP011844832, ISSN: 0093-9994, DOI: 10.1109/TIA.2021.3052426 [retrieved on Mar. 18, 2021] abstract; figures 1,5,6,10.

Dey Asim Kumar, et al., "An Novel Hysteresis Current Control Technique (HCCT) for Single Phase VSI", 2021 1st Odisha International Conference on Electrical Power Engineering, Communication and Computing Technology(ODICON), IEEE, Jan. 8, 2021 (Jan. 8, 2021), pp. 1-6, XP033915904, DOI: 10.1109/0DICON50556.2021.9428937 [retrieved on May 11, 2021] abstract; figures 1,3,9.

* cited by examiner

POWER INVERTER WITH REDUCED BODY DIODE CONDUCTION

CROSS REFERENCE TO RELATED APPLICATIONS

This application is a U.S. National Phase application under 35 U.S.C. § 371 of International Application No. PCT/EP2022/025203, filed on May 4, 2022, and claims benefit to British Patent Application No. GB2106425.8, filed on May 5, 2021. The International Application was published in English on Nov. 10, 2022 as WO 2022/233456 A1 under PCT Article 21(2).

FIELD

The present disclosure refers to a power inverter, an uninterruptible power system with a power inverter and a method for controlling a power inverter.

BACKGROUND

A power inverter is often used in an uninterruptible power system, abbreviated UPS. The power inverter is connected to a load which may be in a short circuit condition. The power inverter is typically configured to maintain an output voltage at the output side even in case of a short circuit condition of the load. The power inverter may use metal-oxide-semiconductor field-effect transistors, abbreviated MOSFET. When a current at the output terminal of the power inverter rises above a current limit, the switching of the MOSFETs is typically interrupted. In this case, a body diode of one of the MOSFETs may start to conduct current. However, the current through the body diode results into a rise of a temperature of the MOSFET.

Document JP 2019058019 A describes an electric power converter that converts a DC voltage provided by a DC power source into an AC voltage provided to a load. The DC voltage is applied to a full bridge comprising four semiconductor elements that are realized as insulated gate bipolar transistors, abbreviated IGBTs, or MOSFETs. Freewheeling diodes are connected in parallel to the semiconductor elements. In case of MOSFETs, parasitic diodes can be used instead of freewheeling diodes. A first semiconductor element couples a first terminal of the DC power source to an inverter node. A second semiconductor element couples a second terminal of the DC power source to the inverter node. An inductor couples the inverter node to a terminal of the load. A current sensor is coupled to the inductor and provides a sensor signal to a control device that controls switching states of the four semiconductor elements. A current is between an upper threshold and a lower threshold which both follow a desired waveform.

Document US2002101751 A1 refers to a hysteretic current control method and an uninterruptible power supply. Document CN 112600450 A describes a DC to AC converter. Document JP 407067352 A also is related to a DC to AC converter; a current signal is compared with two values: A first value is generated by adding a band value to a desired value and a second value is generated by subtracting the band value from the desired value. Document CN 111277158 A refers to signals of a converter; a signal moves between a first and a second AC value. Document EP 3567713 A1 illustrates a method for controlling an inverter; a fan current is compared with a high trip level and a low trip level; both levels are positive.

Publication "Combined use of double-band hysteresis current and proportional resonant control methods for single-phase UPS inverters", H. Komurcugil, IEEE IECON 2014, pp. 1305-1311, describes an inverter with four free-wheeling diodes that are connected in parallel to four transistors.

Publication "An improved hysteresis current controller for grid-connected inverter system to address power quality issues at reduced switching frequency", J. K. Singh et al, IEEE Transaction on Industry Applications, Vol, 57, 2021, pp. 1892-1901, refers to an inverter with four freewheeling diodes that are connected in parallel to four transistors. A current waveform tracks a reference with upper and lower band limits.

Publication "An novel hysteresis current control technique (HCCT) for single phase VSI", A. K. Dey et al, 1st Odisha International Conference on Electric Power Engineering, Communication and Computing Technology, IEEE, 2021 addresses an inverter with four freewheeling diodes that are connected in parallel to four transistors. An AC current is within a band having an AC form.

SUMMARY

In an embodiment, the present disclosure provides a power inverter. The power inverter includes a first and a second input terminal and a first output terminal, an inverter node, a first metal-oxide-semiconductor field-effect transistor (MOSFET) which couples the first input terminal to the inverter node. The power inverter further includes a second MOSFET which couples the second input terminal to the inverter node, an inductor that couples the inverter node to the first output terminal, a current sensor coupled to the inductor and configured to provide a sensor signal that is a function of an inductor current that flows through the inductor, a comparator arrangement coupled to an output of the current sensor and configured to compare the sensor signal with a first limit value, wherein the first limit value is positive with respect to a reference potential, and a control arrangement which is connected on its output side to a control terminal of the first MOSFET and to a control terminal of the second MOSFET and is configured to switch the first MOSFET from a conducting state to a non-conducting state and the second MOSFET from a nonconducting state to a conducting state in case the sensor signal rises above the first limit value. The first output terminal is an AC terminal, the power inverter is configured to generate an output voltage at the first output terminal, and the output voltage is an AC voltage. The comparator arrangement is configured to compare the sensor signal with a second limit value which is negative with respect to the reference potential. The control arrangement is configured to switch the first MOSFET from the nonconducting state to the conducting state and the second MOSFET from the conducting state to the non-conducting state in case the sensor signal falls below the second limit value. The control arrangement comprises a voltage regulator with an input which is coupled to the first output terminal and an output at which a control signal is provided, and wherein the voltage regulator is configured to provide the control signal with a pulse duration which depends on a comparison of the output voltage with a desired alternating current output voltage. The control arrangement comprises a modulator with a first input coupled to the output of the voltage regulator, a second input coupled to the comparator arrangement, a first output coupled to the control terminal of the first MOSFET, and a second output coupled to the control terminal of the second MOSFET. The modulator is configured to control the first and the second MOSFET as a function of the control signal and at least one output signal of the comparator arrangement.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
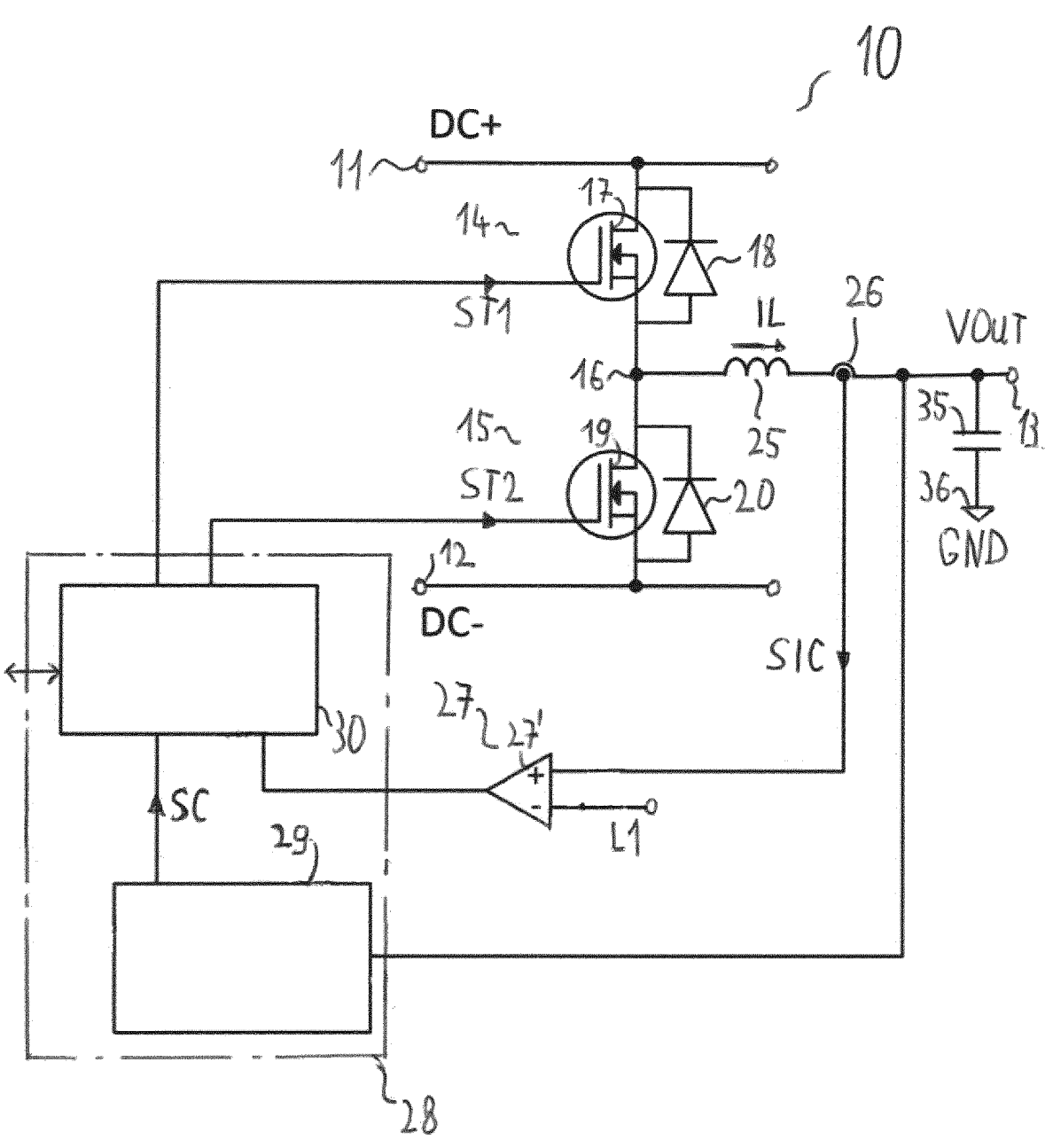
FIGS. 1A to 1D show an exemplary embodiment of a power inverter.

It is an object to provide a power inverter, an uninterruptible power system with a power inverter and a method for controlling a power inverter which reduces a heat generation.

This object is achieved by the subject-matter of the independent claims. Further developments are described in the dependent claims.

There is provided a power inverter, comprising a first and a second input terminal, a first output terminal, an inverter node, a first metal-oxide-semiconductor field-effect transistor-abbreviated MOSFET-which couples the first input terminal to the inverter node, a second MOSFET which couples the second input terminal to the inverter node, an inductor that couples the inverter node to the first output terminal, a current sensor coupled to the inductor and configured to provide a sensor signal that is a function of an inductor current that flows through the inductor, a comparator arrangement coupled to an output of the current sensor and configured to compare the sensor signal with a first limit value, and a control arrangement which is connected on its output side to a control terminal of the first MOSFET and to a control terminal of the second MOSFET. The control arrangement is configured to switch the first MOSFET from a conducting state to a non-conducting state and the second MOSFET from a non-conducting state to a conducting state in case the sensor signal rises above the first limit value.

Advantageously, the first MOSFET is switched from a conducting state to a non-conducting state; thus, providing of energy from the first input terminal via the first MOSFET to the inductor is reduced in case the sensor signal rises above the first limit value. A sensor signal being above the first limit level indicates a short circuit condition of a load coupled to the first output terminal.

Advantageously, the second MOSFET is switched from a non-conducting state to a conducting state in case the sensor signal rises above the first limit value; thus, the inductor current flows through a controlled path of the second MOSFET and not through a body diode of the second MOSFET. Since the controlled path of the second MOSFET has a higher conductivity than the body diode of the second MOSFET, an energy loss in the second MOSFET and a temperature rise are reduced.

In an embodiment of the power inverter, the sensor signal provides information about a direction of the inductor current and about a value of the inductor current. Since the sensor signal rises above the first limit value, a positive inductor current flows through the inductor in the direction towards the first output terminal. The sensor signal is e.g. proportional to the inductor current. The sensor signal is configured to obtain positive values in case of a positive inductor current and negative values in case of a negative inductor current.

In an embodiment of the power inverter, the comparator arrangement is configured to compare the sensor signal with a second limit value which is negative with respect to a reference potential. The control arrangement is configured to switch the first MOSFET from the non-conducting state to the conducting state and the second MOSFET from the conducting state to the non-conducting state in case the sensor signal falls below the second limit value. Since the sensor signal falls below the second limit value, a negative inductor current flows through the inductor in the direction towards the first output terminal.

In an embodiment of the power inverter, the first limit value and the second limit value have opposite signs. An absolute value of the first limit value and of the second limit value are e.g. equal. The first limit value is positive with respect to the reference potential.

In an embodiment of the power inverter, a first voltage that is tapped at the first input terminal is higher than a second voltage that is tapped at the second input terminal.

In an embodiment of the power inverter, the control arrangement is configured to operate the first and the second MOSFET with pulse-width modulation and to set the first MOSFET in the conducting state and the second MOSFET in the non-conducting state at a start of a first phase of a cycle and to set the first MOSFET in the non-conducting state and the second MOSFET in the conducting state at a start of an second phase of the cycle.

In an embodiment of the power inverter, the control arrangement comprises a voltage regulator with an input which is coupled to the first output terminal and an output at which a control signal is provided. The voltage regulator is configured to provide a control signal that has a pulse duration which depends on a comparison of the output voltage with a desired alternating current output voltage, abbreviated desired AC output voltage. The desired AC output voltage can also be named predetermined AC output voltage or set AC output voltage. The control signal sets the start of the first phase.

In an embodiment of the power inverter, the control arrangement comprises a modulator with a first input coupled to the output of the voltage regulator, a second input coupled to the comparator arrangement, a first output that is coupled to the control terminal of the first MOSFET, and a second output that is coupled to the control terminal of the second MOSFET.

In an embodiment of the power inverter, the modulator is configured to control the first and the second MOSFET as a function of the control signal and at least one output signal of the comparator arrangement.

In an embodiment of the power inverter, the modulator is configured to control the first and the second MOSFET by using the pulse duration of the control signal, in case the sensor signal is between the first limit value and the second limit value, and by changing the conducting state of the first MOSFET and of the second MOSFET, in case the sensor signal rises above the first limit value or falls below the second limit value.

In an embodiment of the power inverter, the control arrangement is configured to count a number of cycles during which the sensor signal rises above the first limit value or falls below the second limit value, to compare the number of cycles with a predetermined cycle value and to set the first and the second MOSFET in the non-conducting state in case the number of cycles is higher than the predetermined cycle value. The predetermined cycle value is at least one, alternatively at least five, and alternatively at least ten.

In an embodiment of the power inverter, the comparator arrangement is configured to compare the sensor signal with a further first limit value which is higher than the first limit value. The control arrangement is configured to set the first and the second MOSFET in the non-conducting state at least during the next cycle in case the sensor signal is higher than the further first limit value.

In an embodiment of the power inverter, the comparator arrangement is configured to compare the sensor signal with a further second limit value which is lower than the second limit value. The control arrangement is configured to set the first and the second MOSFET in the non-conducting state at least during the next cycle in case the sensor signal is lower than the further second limit value.

In an embodiment of the power inverter, the current sensor is configured to provide the sensor signal as a function of an amount of the inductor current. In an example, the sensor signal only obtains positive values and the value zero. The control arrangement is configured to determine a current direction of the inductor current. For example, the control arrangement generates a direction signal with the information of the direction of the inductor current. The control arrangement is configured to switch the first MOSFET from a conducting state to a non-conducting state and the second MOSFET from a non-conducting state to a conducting state in case the sensor signal rises above the first limit value and a positive inductor current flows through the inductor in the direction towards the first output terminal.

In an embodiment of the power inverter, the control arrangement is configured to switch the first MOSFET from a non-conducting state to a conducting state and the second MOSFET from a conducting state to a non-conducting state in case the sensor signal rises above the first limit value and a negative inductor current flows through the inductor in the direction towards the first output terminal.

In an embodiment of the power inverter, the first and the second MOSFET are realized as silicon carbide MOSFETs.

In an embodiment of the power inverter, the power inverter includes a capacitor that couples the first output to a reference potential terminal.

In an embodiment of the power inverter, the power inverter is realized as two-level inverter.

There is provided an uninterruptible power system, abbreviated UPS. The UPS comprises the power inverter, a power converter and a battery coupled to the power inverter and the power converter.

There is provided a method for controlling a power inverter, comprising providing a first voltage to a first metal-oxide-semiconductor field-effect transistor—abbreviated MOSFET— which is coupled to an inverter node, providing a second voltage to a second MOSFET which is coupled to the inverter node, wherein the inverter node is coupled to a first output terminal via an inductor, providing a sensor signal that is a function of an inductor current that flows through the inductor, comparing the sensor signal with a first limit value, and switching the first MOSFET from a conducting state to a non-conducting state and the second MOSFET from a non-conducting state to a conducting state in case the sensor signal rises above the first limit value.

Advantageously, the second MOSFET is set in the conducting state to take over the inductor current having a high positive current value.

The power inverter is particularly suitable for the uninterruptible power system and for the method for controlling a power inverter. Features described in connection with the power inverter can therefore be used for the uninterruptible power system and the method and vice versa.

In an example, the power inverter implements a hardware current limit modulation method. The power inverter is e.g. realized as silicon carbide inverter, abbreviated SiC inverter. The method realizes a modulation method to improve short circuit current capability of the SiC MOSFET based inverter. The method is performed by utilizing the MOSFET channel instead of the intrinsic (weaker) body diode during a short circuit condition.

Advantageously, a high short circuit current capability of the power inverter is achieved which is useful for an UPS unit. With high short circuit current, the power inverter can quickly clear faults downstream. For a 2-level silicon carbide (SIC) MOSFET inverter, the semiconductor material might be expensive. The method avoids to oversize the semiconductors for increased short circuit current capability.

In an example, the modulator detects the current direction when the hardware current limit is reached. By utilizing the direction signal, the modulator is able to turn on the MOSFET out of the first MOSFET and the second MOSFET that is in parallel with the diode, where the current would naturally commutate. When the MOSFET is turned on, the current commutates to the channel of that MOSFET, instead of the diode. Due to better conduction parameters of the MOSFET channel, the losses are lower, when compared to case where the intrinsic body diode is used. Advantageously, the circuitry which detects the current direction during the current limit can be realized in a very cost effective way. For example, if a comparator arrangement is used for detecting the current limit, signals from positive and negative comparators of the comparator arrangement are routed separately from the positive and negative comparator to the modulator. The modulator is realized e.g. as a complex programmable logic device, abbreviated CPLD, or field-programmable gate array, abbreviated FPGA.

In an example, a power inverter was simulated: Using a current limit of 1300 A and a heat sink temperature of 80° C., the junction temperature of the semiconductors reaches e.g. 149° C. in case a current flows through the body diode. The recommended maximum temperature for the semiconductors is e.g. 150° C. When using the controlled path of the MOSFET instead of the body diode of the MOSFET in the same conditions, the semiconductor temperature reaches e.g. 136° C. The current limit might be increased to 1400 A, and the semiconductors would reach an operating temperature of e.g. 147° C. In an example, the thermal margins may be improved by 13° C. or the output short circuit current might be increased by about 8%, with the proposed modulation method.

In an example, an unwanted output voltage is generated when there is a mistrigger of the current limit. One example is when a current sensor is disconnected, depending on the circuit design, the system might see full current in one leg. Optionally, the proposed modulation is limited to a set number of PWM cycles. If the current limit lasts longer, all PWM signals on that leg are disabled until the current limit signal clears. Advantageously, the issue of the mistriggered current limits can be overcome.

In another example, the issue of mistriggered current limits is addressed by having two different current limits in the power inverter. The modulator would act as described above when the sensor signal reaches the first limit value (which is the lower limit). The inductor current should then normally not reach a further first limit value (which is higher than the first limit). In case the sensor signal reaches the further first limit value, the first and the second MOSFET are set in a non-conducting state. Thus, the modulator would enter a fault mode and disable the PWM signals, until the current limit signal clears.

The following description of figures of embodiments shall further illustrate and explain aspects of the power inverter, of the UPS and of the method. Parts, components and circuits with the same structure and the same effect, respectively, appear with equivalent reference symbols. Insofar as parts, components and circuits correspond to one another in terms of their function in different figures, the description thereof is not repeated for each of the following figures.

FIGS. 1A to 1D show an exemplary embodiment of a power inverter;

FIGS. 2A to 2D show a further exemplary embodiment of a power inverter; and

Figure 3:
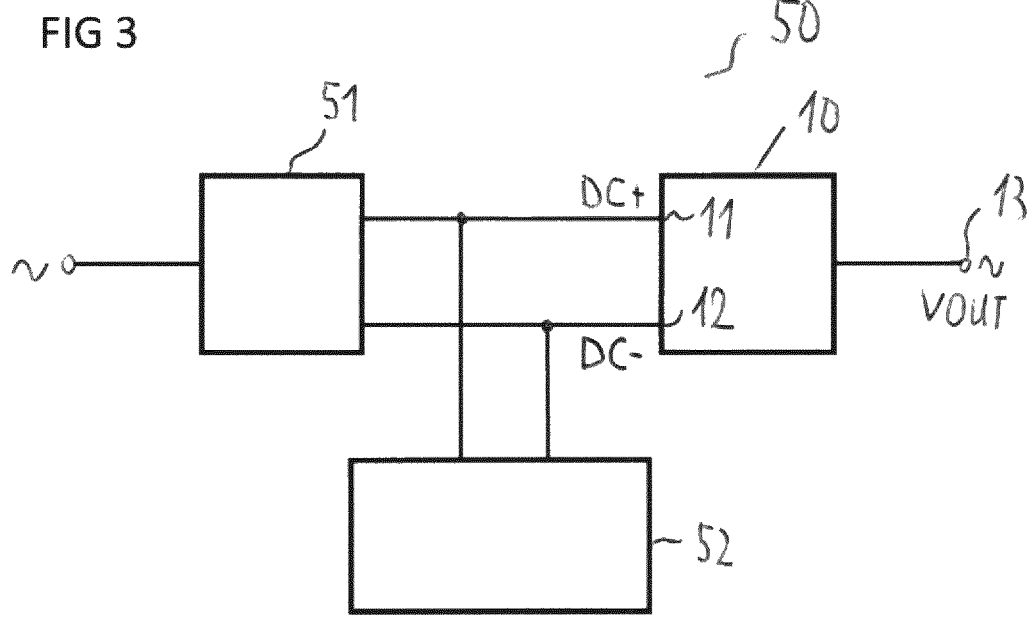
FIG. 3 shows an exemplary embodiment of an uninterruptible power system with a power inverter.

FIG. 3 shows an exemplary embodiment of an uninterruptible power system with a power inverter.

FIG. 1A shows an exemplary embodiment of a power inverter 10. The power inverter 10 is realized as two-level inverter. The power inverter 10 comprises a first and a second input terminal 11, 12, a first output terminal 13 and an inverter node 16. A first metal-oxide-semiconductor field-effect transistor 14, abbreviated MOSFET, of the power inverter 10 couples the first input terminal 11 to the inverter node 16. A second MOSFET 15 of the power inverter 10 couples the second input terminal 12 to the inverter node 16. The first and the second MOSFET 14, 15 are realized as silicon carbide MOSFETs. The first and the second MOSFET 14, 15 are both realized with the same channel type. The first and the second MOSFET 14, 15 are both n-channel MOSFETs. The first MOSFET 14 includes a body diode 18. Thus, as shown in FIG. 1A, the first MOSFET 14 includes a controlled path 17 (illustrated with the typical symbol of a MOSFET) and the body diode 18. Similarly, the second MOSFET 15 includes a controlled path 19 and a body diode 20. The controlled path can be named channel.

An inductor 25 of the power inverter 10 couples the inverter node 16 to the first output terminal 13. The first and the second input terminal 11, 12 are direct current terminals, abbreviated DC terminals. The first output terminal 13 is an alternating current terminal, abbreviated AC terminal.

The power inverter 10 includes a current sensor 26 coupled to the inductor 25. The current sensor 26 is located between the inductor 25 and the first output terminal 13. Alternatively, the current sensor 26 is located between the inverter node 16 and the inductor 25. The power inverter 10 includes a comparator arrangement 27 coupled to an output of the current sensor 26. The current sensor 26 is e.g. a Hall sensor or a coil. The comparator arrangement 27 comprises a first comparator 27' which is named e.g. positive comparator.

A control arrangement 28 of the power inverter 10 is connected on its output side to a control terminal of the first MOSFET 14 and to a control terminal of the second MOSFET 15. The control arrangement 28 comprises a voltage regulator 29 with an input which is coupled to the first output terminal 13, e.g. via a voltage divider (not shown).

The control arrangement 28 comprises a modulator 30 with a first input coupled to an output of the voltage regulator 19 and a second input coupled to the comparator arrangement 27. A first output of the modulator 30 is coupled to a control terminal of the first MOSFET 14. A second output of the modulator 30 is coupled to a control terminal of the second MOSFET 15. The power inverter 10 includes a capacitor 35 that is coupled to the first output terminal 13. The capacitor 35 couples e.g. the first output terminal 13 to a reference potential terminal 36 at which a reference potential GND can be tapped. Alternatively, the capacitor 35 couples e.g. the first output terminal 13 to a floating node.

A first voltage DC+ is tapped at the first input terminal 11. A second voltage DC− is tapped at the second input terminal 12. The first voltage DC+ is higher than the second voltage DC−. The first voltage DC+ and the second voltage DC− are DC voltages. The power inverter 10 generates an output voltage VOUT at the first output terminal 13. The output voltage VOUT is an AC voltage. An inductor current IL flows through the inductor 25. The inductor current IL has a positive value in case of a current flow from the inductor 25 in the direction to the first output terminal 13. The inductor current IL has a negative value in case of a current flow from the inductor 25 in the direction to the inverter node 16. The current sensor 26 provides a sensor signal SIC that is a function of the inductor current IL. The comparator arrangement 27 (more specifically the first comparator 27') compares the sensor signal SIC with a first limit value L1.

The voltage regulator 29 generates a control signal SC at an output of the voltage regulator 29. The control arrangement 28 provides a first control signal ST1 to the first MOSFET 14 and a second control signal ST2 to the second MOSFET 15. The modulator 30 controls the first and the second MOSFET 14, 15. The modulator 30 generates the first and the second control signal ST1, ST2 as a function of the control signal SC and at least one output signal of the comparator arrangement 27. The control arrangement 28 is realized as e.g. as at least one of a microcontroller, microprocessor, analog circuits and logic gates. The logic gates may be realized as a complex programmable logic device, abbreviated CPLD, or field-programmable gate array, abbreviated FPGA. The control arrangement 28 has e.g. a data connection. The data connection is optionally realized as a bus connection.

The operation of the power inverter 10 is described below using the FIGS. 1B to 1D.

Figures 1B, 1C, 1D:
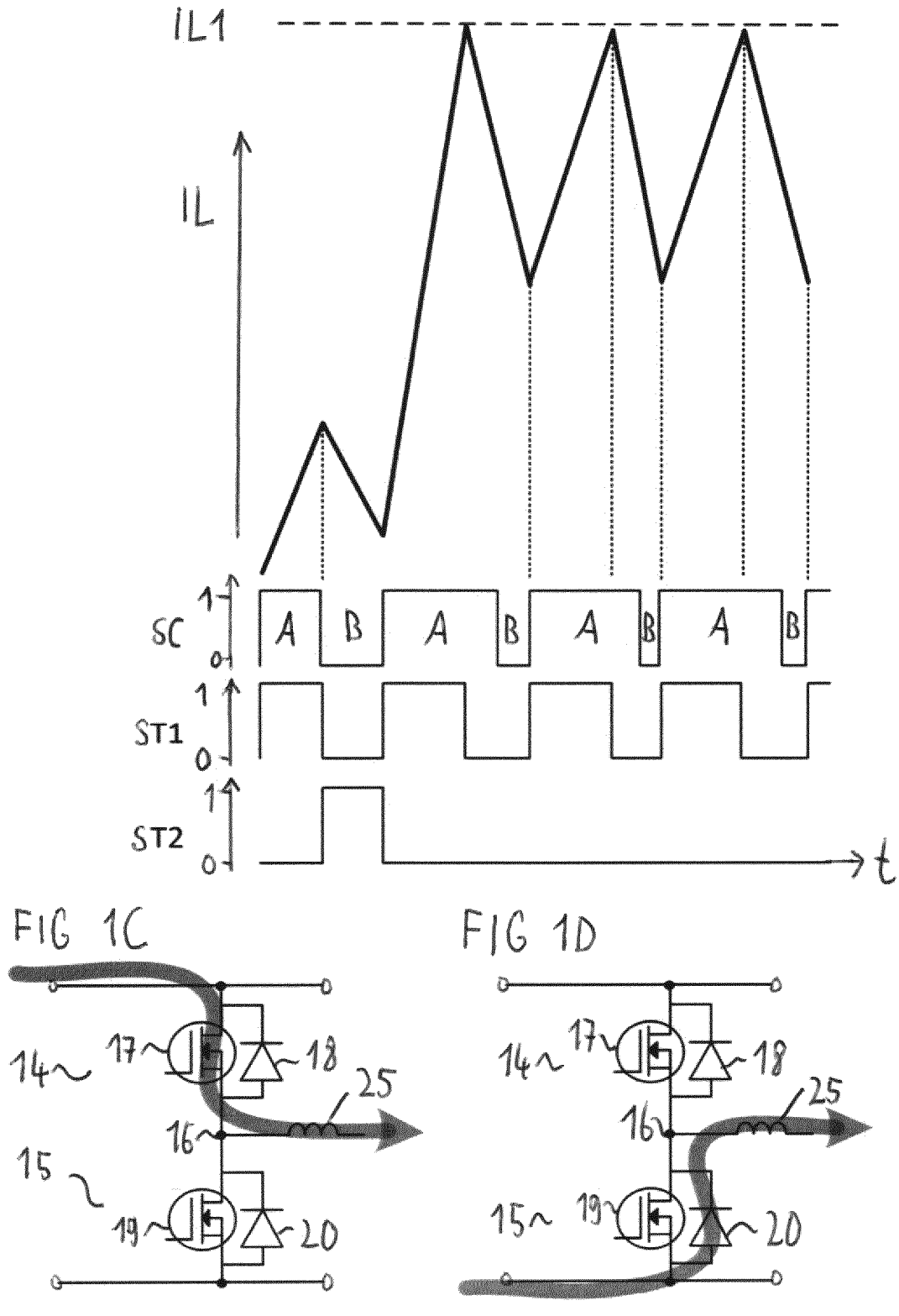

FIG. 1B shows an example of signals of the power inverter 10 shown in FIG. 1A. The inductor current IL, the control signal SC, the first control signal ST1 and the second control signal ST2 are shown as a function of a time t.

FIGS. 1C and 1D show examples of a current flow through the power inverter 10 shown in FIGS. 1A and 1B.

The control arrangement 28 operates the first and the second MOSFET 14, 15 with pulse-width modulation, abbreviated PWM. Thus, a cycle of the PWM includes a first phase A and a second phase B. The control signal SC sets the start of the first phase A. The control signal SC has a pulse duration which depends on a comparison of the output voltage VOUT with a desired alternating current output voltage. The desired alternating current output voltage and thus also the output voltage VOUT has a positive and a negative half-wave. The control signal SC also sets the start of the second phase B.

The control arrangement 28 sets the first MOSFET 14 in a conducting state and the second MOSFET 15 in a nonconducting state at the start of the first phase A of the PWM cycle and sets the first MOSFET 14 in the non-conducting state and the second MOSFET 15 in the conducting state at the start of the second phase B of the cycle. In the first cycle, the first control signal ST1 is equal to the control signal SC and the second control signal ST2 is an inverted signal with respect to the first control signal ST1.

The sensor signal SIC is e.g. proportional to the inductor current IL. As shown in the second cycle, the inductor current IL rises above a first current value IL1. Thus, the sensor signal SIC rises above the first limit value L1. At this point of time, the control arrangement 28 switches the first MOSFET 14 from the conducting state to the non-conducting state and the second MOSFET 15 remains in the non-conducting state during the first and the second phase A, B of the cycle. A positive inductor current IL flows through the inductor 25 in the direction towards the first output terminal 13. Since none of the controlled paths of the MOSFETs 14, 15 are in the conducting state, the inductor current IL flows through a body diode, namely the body diode 20 of the second MOSFET 15.

In a third and fourth cycle, the first MOSFET 14 is set in a conducting state at the start of each cycle that means at the start of the first phase A. The start of the cycle is triggered by the control signal SC. Since the sensor signal SIC rises above the first limit value L1, the control arrangement 28 switches the first MOSFET 14 from the conducting state to the non-conducting state. The second MOSFET 15 is in the non-conducting state during the first phase A. As illustrated in FIG. 1C, in the first phase A, the inductor current IL flows from the first input terminal 11 via the first MOSFET 14 and the inductor 35 to the first output terminal 13.

Since the sensor signal SIC was above the first limit value L1 in the first phase A, the second MOSFETs 15 is not set in a conducting state in the second phase B. However, the body diode 20 of the second MOSFET 15 carries the inductor current IL. As elucidated in FIG. 1D, the inductor current IL flows from the second input terminal 12 via the body diode 20 of the second MOSFET 15 and the inductor 35 to the first output terminal 13.

In the two-level power inverter 10 as shown in FIGS. 1A to 1D, when a hardware current limit is detected, all switching is interrupted. This causes current to commutate to a diode of the power inverter 10 and the inductor current IL starts to decrease. Energy is provided to the first output terminal 13 even in case of a high value of the inductor current IL.

FIGS. 2A to 2D show a further exemplary embodiment of a power inverter 10 that is a further development of the embodiment shown above. The comparator arrangement 27 is configured to compare the sensor signal SIC with a second limit value L2 which is negative with respect to a reference potential GND. The first and the second limit value L1, L2 have e.g. the same absolute value. The first limit value L1 is positive with respect to the reference potential GND. The comparator arrangement 27 further comprises a second comparator 27" which is named e.g. negative comparator. The second comparator 27" compares the sensor signal SIC with the second limit value L2.

The modulator 30 controls the first and the second MOSFET 14, 15 by using the pulse duration of the control signal SC in case the sensor signal SIC is between the first limit value L1 and the second limit value L2 (as shown in the first cycle), and by switching the first MOSFET 14 from the conducting state into the non-conducting state and the second MOSFET 15 from the non-conducting state into the conducting state), in case the sensor signal SIC is above the first limit value L1 (as shown in the second to fourth cycle). In this case, a positive inductor current IL flows through the inductor 25 in the direction towards the first output terminal 13.

Figure 2:
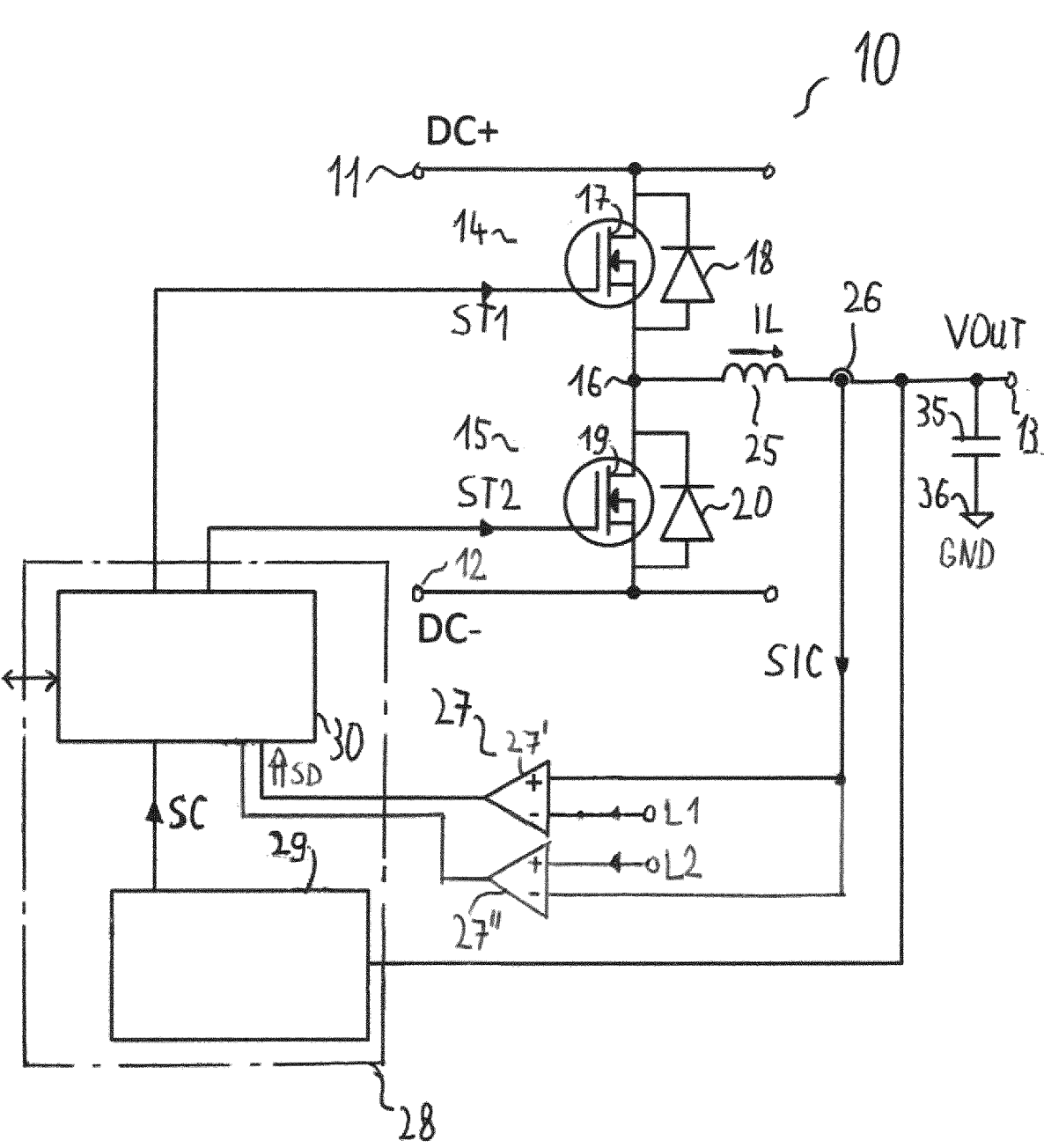
FIGS. 2A to 2D show a further exemplary embodiment of a power inverter.
Figure 2B:
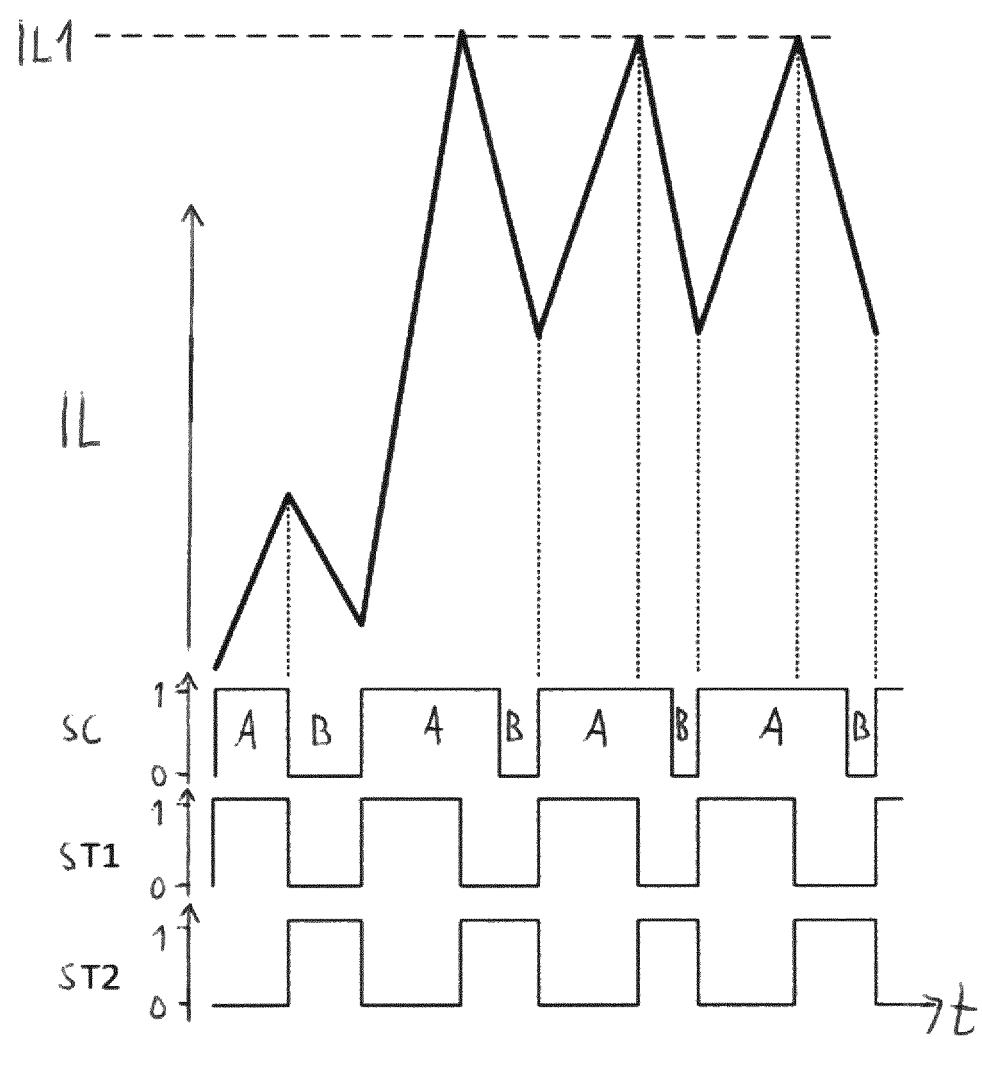
Figures 2C, 2D:
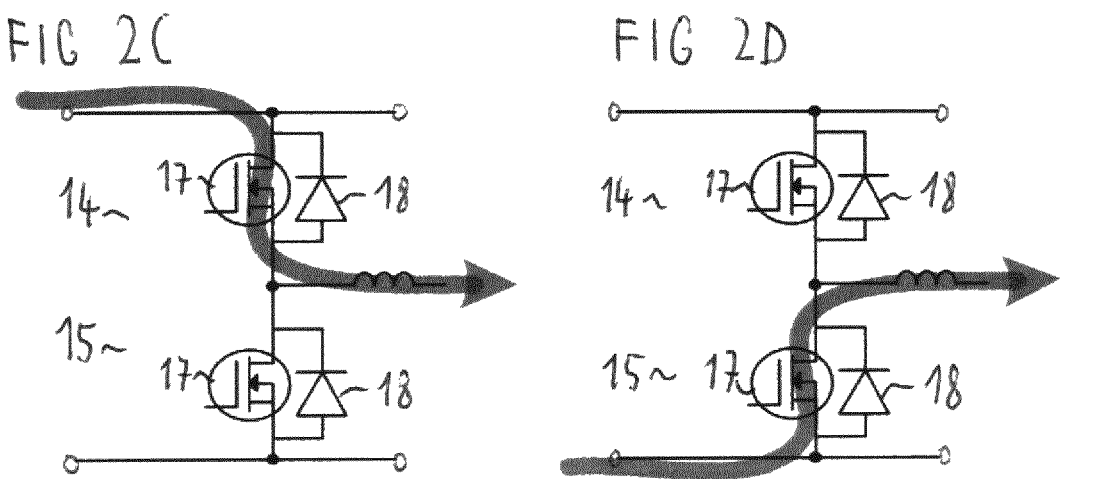

The modulator 30 controls the first and the second MOSFET 14, 15 by switching the first MOSFET 14 from the non-conducting state into the conducting state and the second MOSFET 15 from the conducting state into the non-conducting state, in case the sensor signal SIC is below the second limit value L2 (not shown in FIG. 2B). In this case, a negative inductor current IL flows through the inductor 25 in the direction towards the first output terminal 13.

The control arrangement 28 is configured to switch the first MOSFET 14 from the non-conducting state to the conducting state and the second MOSFET 15 from the conducting state to the non-conducting state in case the sensor signal SIC falls below the second limit value L2. The second control signal ST2 is an inverted signal with respect to the first control signal ST1 in case the sensor signal SIC is above the first limit value L1, between the first and the second limit value L1, L2 and below the second limit value L2.

In an example, the control arrangement 28 counts a number of cycles during which the sensor signal SIC rises above the first limit value L1 or falls below the second limit value L2. The control arrangement 28 compares the number of cycles with a predetermined cycle value and sets the first and the second MOSFET 14, 15 in the non-conducting state in case the number of cycles is higher than the predetermined cycle value. The predetermined cycle value is at least one, alternatively at least five or at least ten.

In an example, the control arrangement 28 or the comparator arrangement 27 generates a direction signal SD depending on a direction of the inductor current IL. The direction signal SD is based on which of the two comparators 27', 27" is triggered. If the first comparator 27' is triggered, the direction is positive; thus, the direction signal SD indicates a positive direction of the inductor current IL, meaning a positive value of the inductor current IL. If the second comparator 27" is triggered, the direction is negative; thus, the direction signal SD indicates a negative direction of the inductor current IL, meaning a negative value of the inductor current IL. In an example, the direction signal SD includes the information that the inductor current IL is not in a range between the first current value IL1 and a second current value IL2 and the information about the direction of the inductor current IL.

The control signal SC is driven as part of the voltage control loop. The voltage control loop includes tapping the output voltage VOUT at the first output terminal 13, the voltage regulator 29, the modulator 30 and providing the first and the second control signal ST1, ST2. When the modulator 30 sees a positive or negative current limit, it overrides the control signal SC from the voltage regulator 29. In other words, when the modulator 30 receives the information by the comparator arrangement 27 that the inductor current IL has a value above the first current value IL1 or below the second current value IL2, the modulator 30 provides the first and the second control signal ST1, ST2 independent of the control signal SC. The first current value IL1 and the second current value IL2 have opposite signs. For example, the first current value IL1 and the second current value IL2 have the same amount. In case the inductor current IL is above the first current value IL1, the sensor signal SIC rises above the first limit value L1 and the first comparator 27' changes its output value. In case the inductor current IL is below the second current value IL2, the sensor signal SIC falls below the second limit value L2 and the second comparator 27" changes its output value.

The direction signal SD is configured for overriding the first and the second control signals ST1, ST2. If a positive current limit is triggered that means if the sensor signal SIC rises above the first limit value L1, the first MOSFET 14 is turned off and the second MOSFET 15 is turned on for up to a maximum number of PWM cycles defined. If a negative current limit is triggered that means if the sensor signal SIC falls below the second limit value L2, the second MOSFET 15 is turned off and the first MOSFET 14 is turned on for up to the maximum number of PWM cycles defined. The predetermined cycle value can be named maximum number of PWM cycles. The MOSFETs 14, 15 are turned on means that the controlled path 17, 19 of the MOSFETs 14, 15 are switched in a conducting state. The MOSFETs 14, 15 are turned off means that the controlled path 17, 19 of the MOSFETs 14, 15 are switched in a non-conducting state.

This has the effect that in case the direction signal SD indicates a positive inductor current IL flowing through the inductor 25 in the direction towards the first output terminal 13, the pulse of the first control signal ST1 is shortened with respect to the pulse duration of the control signal SC, in case the sensor signal SIC is not between the first limit value L1 and the second limit value L2. In case the direction signal SD indicates a negative inductor current IL flowing through the inductor 25 in the direction towards the first output terminal 13, the pulse of the first control signal ST1 is increased with respect to the pulse duration of the control signal SC, in case the sensor signal SIC is not between the first limit value L1 and the second limit value L2.

Optionally, the sensor signal SIC only represents an amount of the inductor current IL. The control arrangement 28 or the comparator arrangement 27 generates the direction signal SD depending on a direction of the inductor current IL. In case the sensor signal SIC is above the first limit value L1, the modulator 30 overrides the control signal SC from the voltage regulator 29. The modulator 30 generates the first and the second control signal depending on the direction signal SD as described above. In case the direction signal SD indicates a positive inductor current IL flowing through the inductor 25 in the direction towards the first output terminal 13, the pulse of the first control signal ST1 is shortened with respect to the pulse duration of the control signal SC, in case the sensor signal SIC is not between the first limit value L1 and zero. In case the direction signal SD indicates a negative inductor current IL flowing through the inductor 25 in the direction towards the first output terminal 13, the pulse of the first control signal ST1 is increased with respect to the pulse duration of the control signal SC, in case the sensor signal SIC is not between the first limit value L1 and zero.

FIG. 3 shows an exemplary embodiment of an uninterruptible power system with a power inverter 10 that is a further development of the embodiments shown above. Additionally, the uninterruptible power system 50 comprises a power converter 51 and a battery 52. The battery 52 is coupled to the power inverter 10 and the power converter 51.

The embodiments shown in FIGS. 1A to 3 as stated represent examples of the improved power inverter and method; therefore, they do not constitute a complete list of all embodiments according to the improved power inverter and method. Actual power inverters and methods may vary from the embodiments shown in terms of parts, structures, shape and circuits, for example.

The invention claimed is:

1. A power inverter, comprising:
   a first and a second input terminal and a first output terminal;
   an inverter node;
   a first metal-oxide-semiconductor field-effect transistor (MOSFET) which couples the first input terminal to the inverter node;
   a second MOSFET which couples the second input terminal to the inverter node;
   an inductor that couples the inverter node to the first output terminal;
   a current sensor coupled to the inductor and configured to provide a sensor signal that is a function of an inductor current that flows through the inductor;
   a comparator arrangement coupled to an output of the current sensor and configured to compare the sensor signal with a first limit value, wherein the first limit value is positive with respect to a reference potential; and
   a control arrangement which is connected on its output side to a control terminal of the first MOSFET and to a control terminal of the second MOSFET and is configured to switch the first MOSFET from a conducting state to a non-conducting state and the second MOSFET from a nonconducting state to a conducting state in case the sensor signal rises above the first limit value,
   wherein the first output terminal is an AC terminal,
   wherein the power inverter is configured to generate an output voltage at the first output terminal,
   wherein the output voltage is an AC voltage,
   wherein the comparator arrangement is configured to compare the sensor signal with a second limit value which is negative with respect to the reference potential,
   wherein the control arrangement is configured to switch the first MOSFET from the nonconducting state to the conducting state and the second MOSFET from the conducting state to the non-conducting state in case the sensor signal falls below the second limit value,
   wherein the control arrangement comprises a voltage regulator with an input which is coupled to the first output terminal and an output at which a control signal is provided, and wherein the voltage regulator is configured to provide the control signal with a pulse duration which depends on a comparison of the output voltage with a desired alternating current output voltage,
   wherein the control arrangement further comprises a modulator comprising:
      a first input coupled to the output of the voltage regulator;
      a second input coupled to the comparator arrangement;
      a first output coupled to the control terminal of the first MOSFET; and
      a second output coupled to the control terminal of the second MOSFET, and
   wherein the modulator is configured to control the first and the second MOSFET as a function of the control signal and at least one output signal of the comparator arrangement.

2. The power inverter of claim 1, wherein a first voltage that is tapped at the first input terminal is higher than a second voltage that is tapped at the second input terminal, wherein the control arrangement is configured:
   to operate the first and the second MOSFET with pulse-width modulation, and to set the first MOSFET in the conducting state and the second MOSFET in the nonconducting state at a start of a first phase of a cycle and to set the first MOSFET in the nonconducting state and the second MOSFET in the conducting state at a start of a second phase of the cycle.

3. The power inverter of claim 1, wherein the modulator is configured to control the first and the second MOSFET,
    by using the pulse duration of the control signal in case the sensor signal is between the first limit value and the second limit value, and
    by changing the conducting state of the first MOSFET and of the second MOSFET in case the sensor signal rises above the first limit value or falls below the second limit value.

4. The power inverter of claim 1, wherein the control arrangement is configured:
    to count a number of cycles during which the sensor signal rises above the first limit value or falls below the second limit value,
    to compare the number of cycles with a predetermined cycle value and
    to set the first and the second MOSFET in the non-conducting state in case the number of cycles is higher than the predetermined cycle value,
wherein the predetermined cycle value is at least one.

5. The power inverter of claim 1, wherein the comparator arrangement is configured to compare the sensor signal with a further first limit value which is higher than the first limit value, and wherein the control arrangement is configured to set the first and the second MOSFET in the non-conducting state at least during a next cycle in case the sensor signal is higher than the further first limit value.

6. The power inverter of claim 1, wherein the current sensor is configured to provide the sensor signal as a function of an amount of the inductor current, and wherein the control arrangement is configured to determine a current direction of the inductor current and to switch the first MOSFET from the conducting state to the non-conducting state and the second MOSFET from the non-conducting state to the conducting state in case the sensor signal rises above the first limit value and a positive inductor current flows through the inductor in a direction towards the first output terminal.

7. The power inverter of claim 6, wherein the control arrangement is configured to switch the first MOSFET from the non-conducting state to the conducting state and the second MOSFET from the conducting state to the non-conducting state in case the sensor signal rises beyond the second limit value and a negative inductor current flows through the inductor in a direction towards the first output terminal.

8. The power inverter of claim 1, wherein the first and the second MOSFET are realized as silicon carbide MOSFETs.

9. The power inverter of claim 1, wherein the power inverter is realized as two-level inverter.

10. The power inverter of claim 1, wherein an absolute value of the first limit value and of the second limit value are equal.

11. An uninterruptible power system, comprising the power inverter of claim 1, a power converter and a battery that is coupled to the power inverter and the power converter.

12. A method for controlling a power inverter, the method comprising:

providing a first voltage to a first metal-oxide-semiconductor field-effect transistor (MOSFET) which is coupled to an inverter node;

providing a second voltage to a second MOSFET which is coupled to the inverter node, wherein the inverter node is coupled to a first output terminal via an inductor, wherein the first output terminal is an alternating current (AC) terminal;

generating an output voltage at the first output terminal, wherein the output voltage is an AC voltage;

providing, by a current sensor coupled to the inductor, a sensor signal that is a function of an inductor current that flows through the inductor;

comparing the sensor signal with a first limit value which is positive with respect to a reference potential, wherein the comparing is performed by a comparator arrangement coupled to an output of the current sensor;

comparing, using the comparator arrangement, the sensor signal with a second limit value which is negative with respect to the reference potential;

switching, by a control arrangement, the first MOSFET from a conducting state to a non-conducting state and the second MOSFET from a non-conducting state to a conducting state in case the sensor signal rises above the first limit value, the control arrangement comprising a modulator and a voltage regulator with an input which is coupled to the first output terminal and an output at which a control signal is provided;

switching, by the control arrangement, the first MOSFET from the non-conducting state to the conducting state and the second MOSFET from the conducting state to the non-conducting state in case the sensor signal falls below the second limit value;

providing, by the voltage regulator, the control signal with a pulse duration which depends on a comparison of the output voltage with a desired alternating current output voltage; and controlling, by the modulator, the first MOSFET and the second MOSFET as a function of the control signal and at least one output signal of the comparator arrangement, the modulator comprising:
    a first input coupled to the output of the voltage regulator;
    a second input coupled to the comparator arrangement;
    a first output coupled to a control terminal of the first MOSFET; and
    a second output coupled to a control terminal of the second MOSFET.

13. A power inverter, comprising:
a first and a second input terminal and a first output terminal;
an inverter node;
a first metal-oxide-semiconductor field-effect transistor (MOSFET) which couples the first input terminal to the inverter node;
a second MOSFET which couples the second input terminal to the inverter node;
an inductor that couples the inverter node to the first output terminal;
a current sensor coupled to the inductor and configured to provide a sensor signal that is a function of an inductor current that flows through the inductor;
a comparator arrangement coupled to an output of the current sensor and configured to compare the sensor signal with a first limit value, wherein the first limit value is positive with respect to a reference potential; and a control arrangement which is connected on its output side to a control terminal of the first MOSFET and to a control terminal of the second MOSFET and is configured to switch the first MOSFET from a conducting state to a non-conducting state and the second MOSFET from a nonconducting state to a conducting state in case the sensor signal rises above the first limit value, wherein the first output terminal is an AC terminal, wherein the power inverter is configured to generate an output voltage at the first output terminal, and wherein the output voltage is an AC voltage, wherein that the comparator arrangement is configured to compare the sensor signal with a second limit value which is negative with respect to the reference potential, wherein the control arrangement is configured to switch the first MOSFET from the nonconducting state to the conducting state and the second MOSFET from the conducting state to the non-conducting state in case the sensor signal falls below the second limit value, and wherein the control arrangement is configured:

to count a number of cycles during which the sensor signal rises above the first limit value or falls below the second limit value, to compare the number of cycles with a predetermined cycle value, and to set the first and the second MOSFET in the non-conducting state in case the number of cycles is higher than the predetermined cycle value, wherein the predetermined cycle value is at least one.

\* \* \* \* \*